United States Patent [19]
Ito

[11] Patent Number: 5,823,139
[45] Date of Patent: Oct. 20, 1998

[54] ANIMAL EXCRETA DISPOSING MATERIAL CONTAINING WASTE PLASTIC AND PROCESS FOR THE PRODUCTION OF THE MATERIAL

[75] Inventor: Hiroshi Ito, Tokyo-to, Japan

[73] Assignee: Kabushikikaishi Daiki, Tokyo, Japan

[21] Appl. No.: 809,613

[22] PCT Filed: Jul. 25, 1996

[86] PCT No.: PCT/JP96/02094

§ 371 Date: May 19, 1997

§ 102(e) Date: May 19, 1997

[87] PCT Pub. No.: WO97/04643

PCT Pub. Date: Feb. 13, 1997

[30] Foreign Application Priority Data

Jul. 25, 1995 [JP] Japan ................................... 7-219403

[51] Int. Cl.⁶ ............................................... A01K 29/00
[52] U.S. Cl. ............................................................ 119/171
[58] Field of Search ................... 119/171, 172, 119/173

[56] References Cited

U.S. PATENT DOCUMENTS

| | | | |
|---|---|---|---|
| 5,177,036 | 1/1993 | Kunst et al. | 119/171 |
| 5,429,073 | 7/1995 | Ballard | 119/171 |
| 5,429,741 | 7/1995 | Webb et al. | 119/171 |
| 5,489,427 | 2/1996 | Bilbrey | 119/171 |
| 5,662,067 | 9/1997 | Stubbs et al. | 119/171 |

FOREIGN PATENT DOCUMENTS

| | | |
|---|---|---|
| 585928 | 3/1994 | European Pat. Off. . |
| 60-237926 | 11/1985 | Japan . |
| 1-191626 | 8/1989 | Japan . |
| 2-265968 | 10/1990 | Japan . |
| 5-260873 | 10/1993 | Japan . |
| 6-22659 | 2/1994 | Japan . |
| 6-78643 | 3/1994 | Japan . |
| 6-225655 | 8/1994 | Japan . |
| 7-31314 | 2/1995 | Japan . |
| 7-39265 | 2/1995 | Japan . |

*Primary Examiner*—Thomas Price
*Attorney, Agent, or Firm*—Ostrolenk, Faber, Gerb & Soffen, LLP

[57] ABSTRACT

An animal excreta disposing material exhibiting a low calorific value can be produced by the use of a waste plastic exhibiting a high calorific value. An animal excrete disposing granular material exhibiting a low calorific value, produced by mixing one or more waste plastics with an inorganic material and granulating the obtained mixture; and a process for the production of the material. The further addition of an organic material exhibiting a calorific value of 3000 kcal/kg can give an inexpensive animal excreta disposing material exhibiting a low calorific value.

32 Claims, 2 Drawing Sheets

ANIMAL EXCRETA DISPOSING MATERIAL CONTAINING WASTE PLASTIC AND PROCESS FOR THE PRODUCTION OF THE MATERIAL

TECHNICAL FIELD

The present invention relates to a mammalian excrement treating article made using a plastic waste, particularly, a polyethylene terephthalate waste, a polyethylene waste, a polypropylene waste, a polystyrene waste or the like as a raw material, and more particularly, to a mammalian excrement treating article which is made using a polyethylene terephthalate waste as a raw material and which has a water retention function.

The present invention also relates to a mammalian excrement treating article which is made using a plastic waste as a raw material such as a polyethylene terephthalate, and which has an insecticidal function for exterminating noxious insects adhered to the body of a mammal, particularly, a domestic pet animal, from the mammalian body, and for preventing noxious insects from being adhered to the mammalian body by use thereof at the time of excretion.

BACKGROUND ART

Pet bottles are, for example, light, hard-to-break and transparent containers made of polyethylene terephthalate and are widely used as soy sauce and cooling beverage bottles.

For example, a nonstandardized paper diaper waste generated from a paper diaper manufacturing process is pulverized and classified by screening into a plastic waste comprising a pulverized mixture of polypropylene, polyethylene, rubber and the like, and a water-absorbable resin and paper powder. The plastic waste powder produced in this classifying process is utilized as a starting material for a paper diaper, or used in another application. However, in this classifying process, the plastic waste such as the polypropylene, the polyethylene and the rubber and the like is produced in a large amount which is about one fourth of the treated paper diaper waste. This plastic waste cannot be utilized in any applications. Moreover, this plastic waste has a high calorific value of 5,500 kcal/kg or more and hence, if it is incinerated as it is, the furnace is damaged. For this reason, this plastic waste is separated from the common refuse, and must be incinerated with an incombustible refuse, resulting in a problem that much labor is required. Therefore, the plastic waste is utilized directly for landfilling, which gives rise a problem in a natural environment. It is desired that a plastic waste capable of being incinerated as is the common refuse, can be effectively utilized.

It is an object of the present invention to solve the problems concerning the incineration of the plastic waste having a high calorific value.

The present inventors have found that if the plastic waste such as polyethylene terephthalate, polyethylene, polypropylene and a synthetic rubber and the like is pulverized into a particle size of 5 mm or less. preferably 2 mm or less, a powder, i.e., a congregation of particles, resulting from the pulverization has a water-absorbing ability and a water retention which are significantly increased, as compared with those before the pulverization.

The present inventors have also found that for example, the plastic waste powder having a high calorific value such as a polyethylene terephthalate pulverized into 5 mm or less can be used as a starting material for a incineratable mammalian excrement treating article by incorporating an incombustible inorganic compounding material and further a water-absorbable resin into the plastic waste and forming a mixture into a granular shape.

The present inventors have also found that for example, the plastic waste powder having a high calorific value such as polyethylene terephthalate pulverized into a particle size of 5 mm or less can be incinerated utilizing the water absorbing ability thereof by incorporating an incombustible inorganic compounding material and further a water-absorbable resin into the plastic waste powder to produce a combustible mixture having a high calorific value of 1,000 to 2,500 kcal/kg at the time when it has absorbed water, and thus, they have reached the accomplishment of the present invention.

Further, the present inventors have found that the plastic waste powder such as polyethylene terephthalate, polyethylene, polypropylene and a synthetic rubber and the like has a high calorific value, but if it is used as a raw material for a mammalian excrement treating article, the produced mammalian excrement treating article has a calorific value reduced to 1,000 to 2,5000 kcal/kg by the large amount of water contained in the water-absorbable resin and hence, can be incinerated.

Thereupon, the present inventors have found that by incorporating the plastic waste powder into a mammalian excrement treating article made using a water-absorbable resin as a raw material, the water-absorbing ability of the plastic waste powder can be effectively utilized, and the mammalian excrement treating article can be incinerated, and thus, they have reached the accomplishment of the present invention.

DISCLOSURE OF THE INVENTION

The present invention provides a mammalian excrement treating article, which is produced in the granular form from a plastic waste powder having a particle size of 3 mm or less, an organic compounding material and as amount of a water-absorbable resin smaller than the amount of the plastic waste powder. Thus, the plastic waste powder having a high calorific value is rendered incineratable by utilizing the organic compounding material such as a coffee extraction residue, used tea leaves, wood flour, paper powder and paper-making sludge and the like as a starting material for the mammalian excrement treating article.

In addition, the present invention provides a mammalian excrement treating article, which is produced in the granular form from a plastic waste powder having a particle size of 3 mm or less, an organic compounding material, an amount of a water-absorbable resin smaller than the amount of the plastic waste powder, and an inorganic compounding material. Thus, the plastic waste powder having a high calorific value is rendered incineratable by utilizing the organic compounding material such as a coffee extraction residue, used tea leaves, wood flour, paper powder and paper-making sludge and the like as a starting material for the mammalian excrement treating article.

Further, the present invention provides a process for producing a mammalian excrement treating article in the granular form, comprising the steps of pulverizing a plastic waste into a powder having a particle size of 3 mm or less, mixing the plastic waste powder with an organic compounding material and an amount of a water-absorbable resin smaller than the amount of the plastic waste powder, and granulating the resulting mixture. Thus, the plastic waste powder having a high calorific value is rendered incineratable by utilizing the organic compounding material such as a coffee extraction residue, used tea leaves, wood flour, paper powder, paper-making sludge and the like as the starting material for the mammalian excrement treating article.

Yet further, the present invention provides a process for producing a mammalian excrement treating article in the granular form, comprising the steps of pulverizing a plastic waste into a powder having a particle size of 3 mm or less, mixing the plastic waste powder with an organic compounding material, an inorganic compounding material and an amount of a water-absorbable resin smaller than the amount of the plastic waste powder, and granulating the resulting mixture. Thus, the plastic waste powder having a high calorific value is rendered incineratable by utilizing the organic compounding material such as a coffee extraction residue, used tea leaves, wood flour, paper powder, paper-making sludge and the like as the raw material for the mammalian excrement treating article.

BEST MODE FOR CARRYING THE INVENTION

Figure 1:
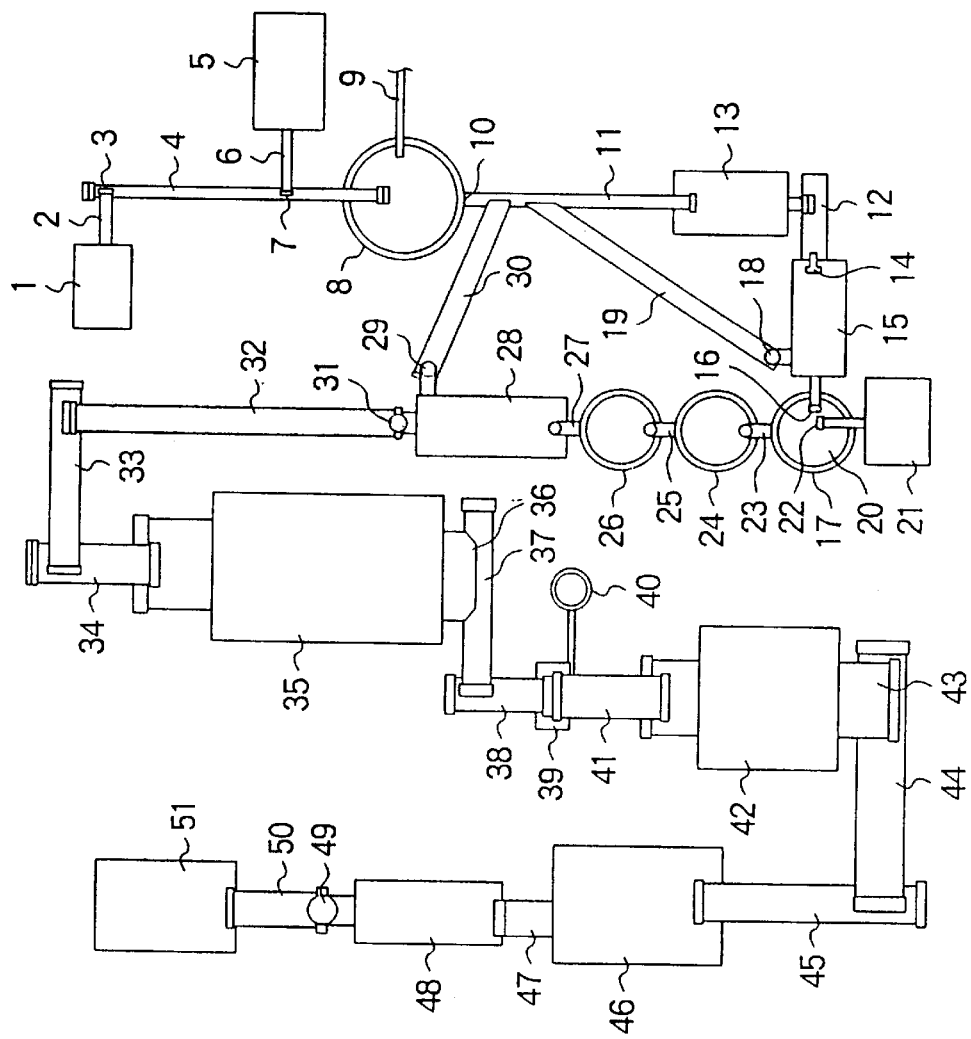
FIG. 1 is a schematic view for illustrating the steps of producing a mammalian excrement treating article according to an embodiment of the present invention.

In the present invention, a mammalian excrement treating article is formed into a granular material which comprises only a granular core section made by mixing a plastic waste powder having a particle size of 3 mm or less, preferably a particle size of 1 mm or less, an organic compounding material and an amount of a water-absorbable resin smaller than the amount of the plastic-waste powder to provide a mixture, and granulating the mixture, or which comprises the granular core section and a covering layer section that covers the granular core section. The mammalian excrement treating article can also be formed by mixing the plastic waste and an inorganic compounding material and granulating the resulting mixture.

In the present invention, one or two or more types of plastic wastes may be used. Examples of such plastic wastes are plastic wastes having a calorific value higher than 5,500 kcal/kg or more, including a polyethylene terephthalate waste (for example, having a calorific value of about 5,500 kcal/kg in a dried state), a polyethylene waste (for example, having a calorific value of about 9,950 kcal/kg to 10,720 kcal/kg in a dried state), a polypropylene waste (for example, having a calorific value of about 10,030 kcal/kg to 10,810 kcal/kg in a dried state), a polyacrylonitrile waste, a nylon waste, a polyester waste and the like. A calorific value of 1,000 to 2,500 kcal/kg in a wet state enabling an incineration of the mammalian excrement treating article can be achieved by using the plastic waste having a high calorific value as a starting material for the mammalian excrement treating article in the above manner.

In the present invention, it has been found that the water absorbing ability and the water retention capability of the plastic waste are significantly enhanced by pulverizing the plastic waste into a plastic waste powder having a particle size of 3 mm or less. Therefore, in the present invention the plastic waste is formed into a powder having a particle size of 3 mm or less. When the plastic waste is a soft plastic, it is pulverized into a powder having a particle size of 3 mm or less because it is difficult to finely pulverize the plastic waste. However, in order to enhance the water absorbing ability and water retention capability, it is preferable that the plastic waste is pulverized into a particle size of 2 mm or less, more preferably, into a particle size of 1 mm or less. When the plastic waste is a hard plastic, the plastic waste is pulverized into a powder having a particle size of 3 mm or less because it is easily pulverized, but in order to enhance the water absorbing ability and water retention capability, it is preferable that the plastic waste is pulverized into a particle size of 1 mm or less.

In the present invention, the organic compounding material is mixed into a product such as a kitty litter in order to give it an adhering ability and an absorbing ability, and at the same time, the calorific value of the plastic waste is reduced. Such an organic compounding material is utilized with a plastic waste having a high calorific value, and therefore an organic compounding material having a calorific value lower than the calorific value of the plastic waste is utilized. It is preferable to utilize an organic compounding material having a calorific value within the bounds of 3,000 to 6,000 kcal/kg. The organic compounding material is an extracted residue of, for example, used tea leaves (for example, having a calorific value of about 5,290 kcal/kg in a dried state), a coffee extraction residue, for example, having a calorific value of about 5,600 kcal/kg in a dried state), a paper powder (for example, having a calorific value of about 3,500 kcal/kg to 4,000 kcal/kg in a dried state), a wood flour (for example, having a calorific value of about 3,000 kcal/kg in a dried state), an alpha starch (4,200 kcal/kg), a paper-making sludge (2,000 kcal/kg), or a mixture of two or more of them.

In the present invention, the utilized paper powder can be pulverized waste such as a paper tube or a pulverized waste powder from paper factories, a pulverized punch-paper scrap, a pulverized used paper or powder from pulverized woven fabrics such as cotton waste, wool waste or linen waste. Paper powder having a particle size of 3 mm or less can be utilized, but it is easier to uniformly mix if a paper powder having a particle size of 1 mm or less is utilized, and the paper powder will have an increased water absorbing ability and retention ability.

In the present invention, pulverized shavings discharged from a lumber mill, namely a wood flour, can be incorporated into the plastic waste powder. A wood flour having a particle size of 3 mm or less can be utilized, but it is easier to uniformly mix if a wood flour having a particle size of 1 mm or less is utilized, and the wood flour will have an increased water absorbing ability and retention ability.

Also, in the present invention, it is preferable to utilize a wood flour with an insect repelling effect, such as pulverized hiba aborvitae shavings and/or cypress shavings, because a hiba aborvitae and/or cypress have an insect repelling effect. In this case, the amount of wood flour is 3% by weight of the granular core section, but it is preferred to have an amount of 5% or more by weight in order to strengthen the insect repelling effect. Using hiba aborvitae shavings and/or cypress shavings as a starting material in a mammalian excrement treating article is also preferred because of the points of having a deodorizing function, an insecticide function, a fungicide function and a perfuming function.

In the present invention, the utilized coffee extraction residue can come from the large amount of coffee extraction residue waste when extracting coffee from roasted coffee beans such as the coffee extraction residue when making coffee for cans or pet bottle containers and the coffee extraction residue when making instant coffee. Coffee extraction residue having a particle size of 3 mm or less can be utilized, but it is easier to uniformly mix if the coffee extraction residue having a particle size of 1 mm or less is utilized, and the coffee extraction residue will have an increased water absorbing ability and retention ability.

In the present invention, the utilized used tea leaves can come from the large amount of tea leaves waste such as the used tea leaves when making tea for cans or pet bottle containers. Used tea leaves having a particle size of 3 mm or less can be utilized, but it is easier to uniformly mix if the used tea leaves having a particle size of 1 mm or less is utilized, and the used tea leaves will have an increased water absorbing ability and retention ability.

In the present invention, examples of the inorganic compounding material powder are bentonite, zeolite, ash resulting from the reburning of pulp sludge (e.g., ash resulting from incineration of FJ-lite), ash resulting from the reburning of dirty sludge and raw garbage, vermiculite, perlite and the like. In the present invention, it is preferable that the amount of inorganic compounding material powder incorporated in a mammalian excrement treating article is determined so that the ash resulting from the incineration thereof occupies 40% by weight or less. In this case, it is preferable that the average particle size of the inorganic compounding material powder is 3 mm or less. When each of the plastic waste and the inorganic compounding material powder which are to be mixed together are pulverized into a powder having a particle size of 1 mm or less, they are easily uniformly mixed together, which is preferred.

In the present invention, in order to provide kitty litter with an insecticidal function, a volatile pyrethroid-based insecticide having an insecticidal function, e.g., an empenthrine, may be mixed into the plastic waste.

The empenthrine of the volatile pyrethroid-based insecticide used in the present invention has a contact toxic effect and is an insecticidal component, but is relatively harmless to a warm-blooded animal or mammal and hence, is used as an insecticide. The empenthrine acts to expel harmful insects such as a tick or an acarid and flea from the mammalian body by contact with the mammalian body. The structure of the empenthrine is represented by the following formula:

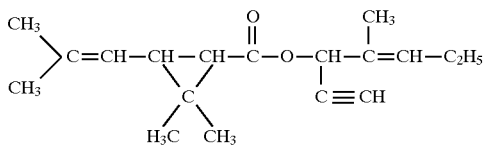

In the present invention, in order to ensure that the granular mammalian excrement treating article has an insecticidal function, the volatile pyrethroid-based insecticide can be contained in the granular core section and/or in the covering layer section. The content of the empenthrine of the volatile pyrethroid-based insecticide is of 0.05% by weight, preferably, 0.4% by weight or more. However, the volatile pyrethloid-based insecticide is relatively expensive, and it is preferable that the content of the pyrethroid-based insecticide is of 1% by weight or less.

In the present invention, when the empenthrine of the volatile pyrethloid is incorporated as an insect-repellent component in order to produce the mammalian excrement treating article having an insecticidal function, the empenthrine can be incorporated in the plastic waste and/or the organic compounding material by dispersing or dissolving it into a non-alcoholic organic solvent such as an iso-paraffinic solvent, a hydrocarbon solvent, a halogenated hydrocarbon solvent or ester solvents. When the empenthrine is incorporated in the mammalian excrement treating article in the above manner, the empenthrine having the insecticidal function can be evaporated from the mammalian excrement treating article during excretion to come into contact with the body of a mammal or animal which is in excretion, thereby expelling an insect adhered to the body of the mammal or animal.

In the present invention, when the empenthrine of the volatile pyrethroid-based insecticide is incorporated alone in the granular core section of the mammalian excrement treating article, a solution of the empenthrine in a solvent may be added to and stirringly mixed with the plastic waste or the inorganic compounding material or the mixture of them, or may be blended by scattering or spraying it to such mixture at a granulating step. When the empenthrine of the volatile pyrethroid-based insecticide is incorporated alone in the covering layer section of the mammalian excrement treating article, the plastic powder or the mixture of the plastic powder and the highly water absorbable resin in the covering layer section may be impregnated with a solution of the empenthrine in a solvent by scattering or spraying or by other means, or the plastic powder or the mixture of the plastic powder and the highly water-absorbable resin, which is to be covered, may be impregnated with the solution of the empenthrine in the solvent, before it is covered. In this manner, the empenthrine can be incorporated by adding it to the surface of the granular core section to form the covering layer section.

In the present invention, a powder of wood shavings discharged from a lumber mill may be incorporated into the plastic waste powder. In this case, if wood shavings of hiba arborvitae or cypress are selected, the repelling of insects can be achieved because such wood shavings contain hinokitiol and a hiba oil have an insect repellent effect. By adding a powder of wood shavings of a hiba arborvitae or a cypress discharged from a lumber mill to the plastic waste powder in place of the empenthrine of the volatile pyrethroid-based insecticide, the insect repelling effect of the hiba oil and/or the hinokitiol is added to the insect expelling effect of the volatile pyrethroid-based insecticide and as a result, the mammalian excrement treating article has a totally increased insect expelling effect.

It is preferable that the wood shavings of the hiba arborvitae and the shavings from the cypress are incorporated as insect expelling components into the mammalian excrement treating article along with the empenthrine. In this case, the wood shavings of the hiba arborvitae and the shavings from the cypress may be used as they are, or may be used after they are pulverized into a given particle size, e.g., of 0.5 mm or less, preferably, 0.3 mm or less, when they are incorporated in the covering layer section, or into a particle size of 1 mm or less when incorporated in the granular core section in the extrusion because the particles have dissipated pressure in the extrusion process.

In the present invention, a substance having a germicidal action may be added to the covering layer section of the mammalian excrement treating article, in order to avoid the generation of fungi. Examples of such substance having the germicidal action are a germicide, an antiseptic agent and a fungicide such as table salt, sorbic acid or the salt thereof, calcium propionate, sodium hypochlorite, and/or benzoic acid or the salt thereof.

In the present invention, the mammalian excrement treating article is capable of preventing the generation of fungi during storage by drying it until the water content reached 15% by weight or less.

In the present invention, when the inorganic compounding material powder used is bentonite and zeolite, it is possible to ensure that the mammalian excrement treating article has a function as a deodorizing agent when the ash resulting from the incineration thereof occupies 40% by weight or less. Also in the present invention, it is preferable to incorporate a highly water-absorbable resin as a water-absorbing agent in order to strengthen the water retention function.

In the present invention, the water-absorbable resin is added as a lubricating agent during granulation of the forming mixture. In the present invention, the water-absorbable resin means a water-absorbable resin other than a highly water-absorbable resin, and an indelible highly water-absorbable resin. Accordingly, it is possible to utilize whichever a highly water-absorbable resin and an inedible highly water-absorbable resin as a resin in the water-absorbable resin. It is preferred to utilize an inedible highly water-absorbable resin in the highly water-absorbable resin because the production cost is lower.

The water-absorbing resin is added to the granular core section of the plastic waste at the time of forming the mammalian excrement treating article in order to increase the water retention ability of the granulated mixture, and to function as a deodorizing agent at the time of pulverizing the granulated mixture. In this case, the water-absorbable resin occupies 3% to 10% by weight of the granulated mixture, and preferably, 5% by weight or less. In the present invention, the highly water-absorbing resin is utilized as the compounding material highly water-absorbing resin in the granular core section of the mammalian excrement treating article, but because it functions to absorb water, thicken, and retain water from the circumference of the granular core section when discharged, it is preferable to control the humidity of the covering layer section.

In the present invention, the water-absorbing resin can be added to the covering layer section in an amount of 13% to 17% by weight, in order to absorb and retain water on the exterior face of the powder particles of the mammalian excrement treating article, and to easily adhere to the circumference of the powder particles of the mammalian excrement treating article. Generally, it is possible to have an amount of powder particles inside the covering layer section of 15% to 25% by weight, but it is preferable to have an amount of 10% to 20% by weight.

In the present invention, the highly water-absorbable resin is a resin which can maintain its shape, even if it has absorbed water in an amount which is several ten times to two hundred times its own weight. Examples of such highly water-absorbable resins are a soponified product of a copolymer of a vinyl ester and an ethylenic unsaturated carboxylic acid or the derivative thereof, a graft polymer of starch and acrylic acid, a cross-linked polyacrylic acid, a copolymer of vinyl alcohol and acrylic acid, a partially hydrolyzed polycrylonitrile, a cross-linked carboxymethyl cellulose, a cross-linked polyethylene glycol, the salt of chitosan, and a gel of pullulan. One of these substances may be contained alone in the plastic waste, or two or more of these substances may be contained in the form of a mixture in the plastic waste.

In the present invention, the water-absorbable resin which may be used includes a water-absorbable resin having a poor water absorbing ability with a water absorbing rate as low as lower than 200 g/g. Examples of such water-absorbable polyacrylic acid resins having such a low water absorbing ability are a fine resin having a larger particle size of, for example, 600 $\mu$m or more, and a fine resin having a smaller particle size of, for example, 20 $\mu$m or less. Such a water-absorbable resin can be produced, for example, by classification from the plastic waste, or can be separated available as a product out of the polyacrylic acid resin. It is preferable that the water-absorbable resin having a particle size of, for example, 600 $\mu$m or more is used in the granular core section, and the fine water-absorbable resin having a particle size of, for example, 20 $\mu$m or more is used in the covering layer section. The highly water-absorbable resin is contained in the diaper waste as described above and hence, when the plastic waste powder is incorporated, the highly water-absorbable resin added may be decreased by an amount contained in the plastic waste.

In the present invention, it is preferable to incorporate a combustible material having a water absorbing function, for example, used tea leaves, a coffee extraction residue, a wood flour or a mixture thereof, into the plastic waste, to ensure the mammalian excrement treating article has an absorbing function.

In the present invention, it is preferable that a compounding substance having an adhesive function and a water retention ability in the covering layer section is incorporated into the plastic waste in order to avoid the pulverization of the excrement treating article which is in service. Examples of such water-soluble or water-dispersible compounding substances are a paper powder pulverized from a lumber mill, a pulverized punch-paper scrap, a solution of polyvinyl alcohol (PVA), a polyethylene glycol, sorbitol, polypropylene glycol and the like, and an alpha starch.

In the present invention, a compounding substance having a lubrication function, an adhesive function and a water retention function in the granular core section is incorporated into the plastic waste in order to avoid the pulverization of the excrement treating article which is in service. Examples of such compounding substances are wheat flour, starch, corn starch, carboxymethyl cellulose (CMC), pullulan or gelatin. They may be used as the compounding substance, alone or in the form of a mixture made by a combination of two or more of them.

In the present invention, when using a diluted solution of a mixture of polyethylene glycol and sorbitol, it is possible to use a diluted solution of polyethylene glycol of 0.08% by weight and sorbitol of 0.03% by weight. In this case, for example, it is possible to cover by spraying an amount of 1 g of the polyethylene glycol and sorbitol mixture over the covering layer section of the granulated mixture for each 1 g of the mammalian excrement treating article.

In the mammalian excrement treating article of the present invention, the inorganic compounding material powder is incorporated into the plastic waste powder and the resulting mixture is granulated, and in order to avoid as much as possible the presence of very fine dust after the granulation it is preferable that the mixture is granulated into a granulate having a grain size of, for example, 3 mm or more. However, if the mixture is granulated into a granulate having a grain size of 7 mm or more, the grains are difficult to scatter from a toilet box inside a room, and even if the grains scatter, it is easy to collect the grains. This case is also preferred for maintaining the sanitation within the room. In these cases, however, the presence of the grains having the grain size of 3 mm or less and the presence of the grains having the grain size of 7 mm or less are not completely rejected. In the present invention, the granulate may be formed into any of spherical, columnar, granular and particulate shapes and the like.

When the paper powder of the covering layer material is adhered to the surface of the mammalian excrement treating article along with a water-soluble or alcohol-soluble adhesive, an excrement such as urine is adhered to the granulate during excretion by a mammal or animal, but portions of the granulate to which the excrement such as urine has been adhered are stuck together to form a solid, which is preferable.

In the present invention, the compounding material incorporated into the previous granulate and the compounding material adhering to the surface of the granulate can be the same substance or a different substance.

In the present invention, the mixture of the plastic waste and the organic compounding material or the mixture of the plastic waste, the organic compounding material and a highly water-absorbable resin or the mixture of the plastic waste, the organic compounding material, an inorganic compounding material and a highly water-absorbable resin is produced by mixing in a mixing device and granulated in a granulating device. The granulating device which may be used includes a conventionally well-known extruding granulating device.

In addition to the extruding granulating device, any various granulating devices of a pan type, drum type and a fluidized-bed type may be used. It is preferable that a compounding substance having an adhesive ability, a water-absorbable resin, a compounding substance having a germicidal action or another compounding substance is adhered to the surface of the granulate of the plastic waste by smearing or the like after the granulation, and then dried, so that the compounding substance adhered is not easily peeled off from the surface of the granulate.

In the case of covering the granular core section with a high quality paper punch scrap and the like which is a relatively non flexible and a paper powder that is hard to absorb water, it is required to pulverize to a diameter, for example, to 0.5 mm or less, in order to improve water retention, external appearance and adhesiveness of the covering layer section. In the case of using a paper powder that is water-absorbing and relatively flexible, it is possible to utilize a cloth with a relatively large diameter powder, for example 0.7 mm or less.

The mammalian excrement treating article according to the present invention is formed by adding the paper powder, the highly water-absorbable resin and the compounding substance such as the volatile empenthrine as an insecticide and the like to the granulate having a grain size of 3 mm or more, preferably, 7 mm or more and containing mainly the plastic waste or the plastic waste and the inorganic compounding material. Therefore, the mammalian excrement treating article can absorb well urine excreted by a mammal, has a good water retention, and can significantly exhibit an insecticidal property to a mammal or animal to which the article is used.

Moreover, the paper powder and the highly water-absorbable resin, as well as in addition, a wheat flour, Poval, starch or another compounding substance having an adhesive ability or a substance having a germicidal action or a mixture of such two or more substances can be incorporated in the mammalian excrement treating article according to the present invention, particularly, in the covering layer section thereof. Therefore, the mammalian excrement treating article is adhered to the excrement discharged from a mammal or animal to wrap the excrement massively therein, and can be simply and easily post-treated. When a deodorizing agent and/or water-absorbing agent is mixed, the mammalian excrement treating article exhibits further excellent deodorizing and water-absorbing properties. Further when a substance having a germicidal action is mixed in the granular core section or the covering layer section, the mammalian excrement treating article can be stored for a long period without generation of fungi or the like.

The present invention will now be described by way of preferred embodiments and accompanying drawings, but the present invention is not limited in any way by the following descriptions or illustrations.

FIG. 1 is a schematic illustration for explaining the steps of producing a mammalian excrement treating article according to an embodiment of the present invention.

EMBODIMENTS

The apparatus used in this embodiment is constructed as described above, so that a predetermined amount of paper diaper waste powder is placed into a metering hopper 1, and a predetermined amount of coffee extraction residue is placed into a metering hopper 5.

Then, a screw conveyer 2 for supplying the paper diaper waste powder via outlet 3, a screw conveyer 6 for supplying the coffee extraction residue via outlet 7 and the main screw conveyer 4 are operated to supply a predetermined amount of paper diaper waste powder and the predetermined amount of coffee extraction residue to a mixing device 8, where they are mixed uniformly with water supplied through a water supplying pipe 9.

The mixture of the paper diaper waste powder, the coffee extraction residue and water is fed through an outlet 10 to a mixture transporting screw conveyer 11 which is in operation via pre-mixing device 13 to an extruding-type granulating device 12. In this embodiment, the extruding-type granulating device 12 extrudes the granulated mixture from the rotary screw from a die 14 having an established pore corresponding to its cross section. The die used has a bore diameter of 5.5 mm and a thickness of 33 mm.

A vibrating screen classifier 15 including an upper screen having a screen opening of 8 mm and a lower screen opening of 4 mm is mounted below the die 14 of the extruding-type granulating device 12 so that the grains in the extruded granulate mixture smaller than 4 mm are separated off, and the grains passed through the screen having the opening of 4 mm are fed to a screened grain transporting conveyer belt 19 connected to the outlet 18 below the screen and then from the screened grain transporting conveyor belt 19 through the mixture transporting screw conveyer 11 back to the granulating device 12, wherein they are granulated again.

In this embodiment, the grains regulated to a grain size in a range of 8 mm to 4 mm, i.e., the grains on the screen having the opening of 4 mm are fed from the outlet 16 above the screen to the interior 20 of a rotary-type disc covering device 17. There, the covering material, from store 21 via conduit 22, incorporating a water-absorbing resin and the mixture of the fixed amount of paper powder are sprinkled and covered. The covered granulate covered from the covering device 17 is fed via conduit 23 to a covering device 24 and via conduit 25 a covering device 26 and while being transported through the vibration-type discs, the covering material made of a mixture of the previously scattered water-absorbing resin and paper powder is made to contact and is covered.

The granulate grains covered with the covering material in the granulate covering devices 17, 24 and 26 are loosened in the vibration screen type grain size-regulating device 28 connected to device 26 via conduit 27. The grains having a grain size of 10 to 5 mm are fed from an outlet 31 above the screen having the screen opening of 5 mm in the vibration screen type grain size regulating device 28 through the conveyer belts 32, 33 and 34 to the first dryer 35 where they are dried. On the other hand, the granulate grains having a grain size smaller than 5 mm are fed via outlet 29 to the mixture transporting screw conveyer 11 by the screened grain transporting conveyer 30 for transporting grains having a grain size capable of being passed through the screen having an opening of 5 mm, and are then returned to the granulating device 12, where they are granulated again.

The temperature of the first dryer 35 for drying the granulate is maintained at a level of 80° C. or more. The dried granulate is fed from outlet 36 via conduits 37, 38 to a spraying device 39 for spraying a diluted solution of polyvinyl alcohol in order to prevent the nappiness or the like of the covering material portion in the surface of the covered granulate. In the spraying device 39, a diluted solution of polyvinyl alcohol is sprayed from a spraying diluted polyvinyl alcohol solution tank 40. The covered granulate sprayed with the diluted solution of polyvinyl alcohol is delivered from a covered-granulate transporting conveyer belt 41 to a second dryer 42 which is a hot air drying machine.

The second dryer dries the covered granulate under a lower drying temperature condition, as compared with the first dryer. The covered granulate dried in the above manner is fed into a product hopper 46 via conduits 43, 44 and 45. The covered granulate placed into the product hopper 46 is regulated in grain size in the grain size regulating device 48 to which it is connected via conduit 47 and fed via outlet 49 and conduit 50 to a granulate packing device 51, where it is packed into a sack and shipped.

In this embodiment, the volatile empenthrine, the germicide and the like are not illustrated, but a solution of volatile empenthrine in a non-alcoholic organic solvent and a solution of a germicide may be sprayed along with the diluted solution of polyvinyl alcohol after drying in the first dryer. In this case, the diluted solution of polyvinyl alcohol and the solutions of empenthrine and germicide in solvents may be formed separately and may be sprayed separately or in the form of a mixture. In this embodiment, no insecticide is incorporated in the granular core section, but for example, a solution of empenthrine in a non-alcoholic organic solvent may be blended in the water-absorbable resin; supplied through the water supplying pipe 17 and incorporated in the granulate. When the empensrine is blended in the highly water-absorbable resin, it is preferable that the blending is carried out with an increased amount of the highly water-absorbable resin, and the blend is dried.

Figure 2:
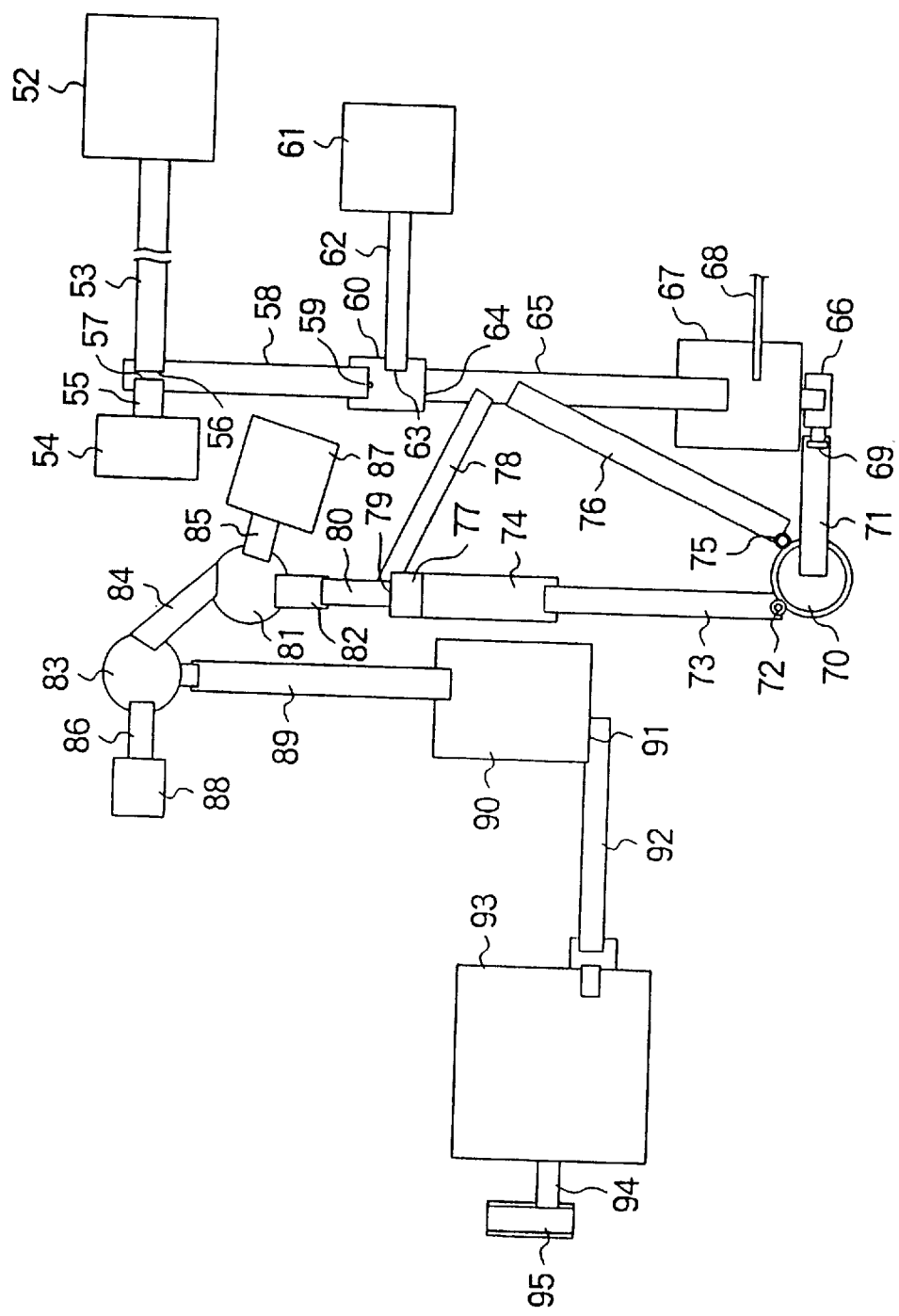
FIG. 2 is a schematic view for illustrating the steps of producing a mammalian excrement treating article according to another embodiment of the present invention.

FIG. 2 is a schematic illustration for explaining a process for producing a mammalian excrement treating article according to an embodiment of the present invention different from the embodiment shown in FIG. 1.

Referring to FIG. 2, a metering hopper 52 for a paper diaper waste powder is located on a transporting path on a conveyer belt 53 of a conveyer system, so that the paper diaper waste powder can be supplied to the conveyer belt 53. A used-tea leaf hopper 54 is located on a transporting path on a conveyer belt 55 of the conveyer system, so that used teas leaves can be supplied to the conveyer belt 55. An outlet portion 56 of the conveyer belt 53 and an outlet portion 57 of the conveyer belt 55 are provided in an opposed relation to each other on a conveyer belt 58 of the conveyer system for transporting the mixture of the paper diaper waste powder and the used tea leaves. An outlet portion 59 of the conveyer belt 58 for transporting the mixture of the paper diaper waste powder and the used tea leaves is located on a mixing device 60.

In this embodiment, a metering hopper 61 for a reburnt-pulp sludge ash product powder is located on a transporting path on a conveyer belt 62 of the conveyer system, so that the reburnt-pulp sludge ash product powder can be supplied to the conveyer belt 62 of the conveyer system. An outlet portion 63 of the conveyer belt 62 for the reburnt-pulp sludge ash product powder is located on the mixing device 60.

To transport a mixture produced in the mixing device 60, a mixture transporting conveyer belt 65 is mounted at a mixture outlet 64 of the mixing device 60. The paper diaper waste powder, the used tea leaves and the reburnt-pulp sludge ash product powder are mixed in the mixing device 60, and the resulting mixture is supplied from the outlet 64 of the mixing device 60 to the mixture transporting conveyer belt 65 of the conveyer system and then from the mixture transporting conveyer belt 65 to a pre-mixing device 67 in an extruding-type granulating device 66.

Water is supplied from a supply pipe 68 to the pre-mixing device 67, where the paper diaper waste powder, the used tea leaves and the reburnt-pulp sludge ash product powder are uniformly mixed.

The mixture of the paper diaper waste powder, the used tea leaves and the reburnt-pulp sludge ash product powder is introduced into the extruding-type granulating device 66 and extruded from a die 69 to form a columnar granulate. A granulate transporting conveyer belt 71 of the conveyer system for feeding the granulate formed by extrusion to a circular screen 70 is mounted below the die 69 of the extruding-type granulating device 66.

In this embodiment, the circular screen 70 has a screen opening of 4 mm, and grains unscreened by this screen are discharged from an outlet 72 above the screen and supplied to an unscreened-grain transporting conveyer belt 73 of the conveyer system connected to the outlet 72.

The unscreened-grain transporting conveyer belt 73 is connected to a vibration-type grain size regulating device 74. The vibration-type grain size regulating device 74 is adapted to loosen the grains adhered to one another by vibration and mounted in order to reduce the pulverization of the granulate in service to the utmost. The grains unscreened by the screen are supplied to the vibration-type grain size regulating device 74 by the unscreened-grain transporting conveyer belt 73.

On the other hand, the grains screened by the circular belt 70 are returned via the mixture transporting conveyer belt 65 to the extrusion-type granulating device 66 by a screened-grain transporting conveyer belt 76 mounted at an outlet 75 below the screen, where they are granulated again.

The grains fed to the vibration-type grain size regulating device 74 are loosened one by one into individual grains by the vibration of the vibration-type grain size regulating device 74 and then delivered from the latter. In this embodiment, a screen 77 having a screen opening of 4 mm is mounted at an outlet of the vibration-type grain size regulating device 74. A screened-grain transporting conveyer belt 78 is mounted below an outlet below the screen 77 and connected to the mixture transporting conveyer belt 65, so that grains screened by the screen 77 are returned via the mixture transporting conveyer belt 65 to the extrusion-type granulating device 66 by the screened-grain transporting conveyer belt 78, where they are granulated again.

In the vibration-type grain size regulating device 74, grains having a grain size of 4 mm or more are taken out from an unscreened-grain transporting conveyer belt 80 of the conveyer system connected to an outlet 79 above the screen. An outlet of the unscreened-grain transporting conveyer belt 80 is connected to a first granulate covering device 81.

In the vibration-type grain size regulating device 74, the grains having the grain size of 4 mm or more are taken out from the unscreened-grain transporting conveyer belt 80 connected to the outlet 79 in order to cover the highly water-absorbable resin and the paper powder on a surface thereof. The grains are supplied to a screen 82 of a first granulate covering device 81 connected to the unscreened-grain transporting conveyer belt 80.

In this embodiment, both of first and second granulate covering devices 81 and 83 are vibration-type covering devices, respectively and mounted in series. An outlet of a screen classifier 84 at an outlet of the first granulate covering device 81 is connected to the second granulate covering device 83.

A first scattering screen 85 is mounted with an outlet on a vibratable covering transporting path of the first granulate covering device 81, and a second scattering spray device 86 is mounted with a spray nozzle which opens into a vibratable covering transporting path of the second granulate covering device 83. The mixture of the highly water-absorbable resin and the paper powder is scattered from the first scattering screen 85, and the diluted solution of polyvinyl alcohol is sprayed from the second scattering spray device 86.

In each of the granulate covering devices, the covering material is scattered onto the vibrated granulate to cover the granulate. The first scattering screen 85 is connected to a first covering material scattering hopper 87 in which the mixture of the highly water-absorbable resin and the paper powder is accommodated, and the second scattering spray device 86 is connected to a covering liquid tank 88 containing the diluted solution of polyvinyl alcohol accommodated therein.

The scattering screen and the scattering spray device are formed so that the covering material to be scattered can be scattered to the granulate constantly at a given ratio.

A covered-granulate transporting conveyer belt 89 of the conveyer system is connected to the second granulate covering device 83, so that the granulate covered in the second granulate covering device 83 is fed, by the covered-granulate transporting conveyer belt 89, to a dryer 90 to which the covered-granulate transporting conveyer belt 89 is connected.

The covered granulate is introduced into the dryer 90 which is a hot air drying machine, where it is dried. The dried granulate is fed to a product tank 93 by a dried-granulate transporting conveyer belt 92 connected to a dried granulate outlet 91. A dried granulate product is taken out into a packing area 95 by a product transporting conveyer belt 94 of the conveyer system mounted below an outlet provided below the product tank 93, where it is packed and shipped.

The apparatus used in this embodiment is constructed in the above manner, so that a predetermined amount of the paper diaper waste powder is placed into the metering hopper 52; a predetermined amount of the used tea leaves are placed into the metering hopper 54, and a predetermined amount of a powder of burnt-pulp sludge ash product is placed into the metering hopper 61.

Then, the paper diaper waste powder supplying conveyer belt 53, the used-tea leaf supplying conveyer belt 55, the conveyer belt 58 and the burnt-pulp sludge ash product powder supplying conveyer belt 62 are operated to supply the predetermined amounts of the paper diaper waste powder, the used tea leaves and the burnt-pulp sludge ash product powder to the mixing device 60, where they are mixed together.

A resulting mixture of the paper diaper waste powder, the used tea leaves and the reburnt-pulp sludge ash product is delivered to the mixture transporting conveyer belt 65 which is in operation and thus, the mixture is fed to the pre-mixing device 67. Further, water is supplied through the supply pipe 68 to the pre-mixing device 67. In the pre-mixing device 67, the paper diaper waste powder, the used tea leaves, the reburnt-pulp sludge ash product and the water are uniformly mixed together. A mixture resulting from the uniform mixing is fed to the extrusion-type granulating device 66.

In this embodiment, the extrusion-type granulating device 66 has a section which is adapted to push the mixture to be granulated, by the rotation of the screw, and which corresponds to a hole in the die 69. In this embodiment, a cylindrical granulate having a diameter of 6 mm and a length of 10 mm is produced.

Grains of the granulate produced by extrusion from the die 69 of the extrusion-type granulating device 66 are fed to the granulate transporting conveyer belt 70, for example, the circular screen 70 having a screen opening of 4 mm, where they are subjected to a screening. Screened grains having a grain size of 4 mm or less are returned to the mixture transporting conveyer belt 65 by the screened-grain transporting conveyer belt 76 and thus fed to the granulating device 66, where they are granulated again.

Unscreened grains having a grain size of 4 mm or more are fed to the vibration-type grain size regulating device 74 by the screened-grain transporting conveyer belt 73, where they are loosened. The grains having a grain size of 4 mm or more are fed to the first granulate covering device 81 by the unscreened-grain transporting conveyer belt 80 above the screen 77, where the covering material comprised of the highly water-absorbable resin and the paper powder blended at a predetermined ratio is coated on such grains to cover them.

On the other hand, the grains loosened into a grain size smaller than 4 mm in the vibration-type grain size regulating device 74 are fed from the outlet below the screen 77 to the mixture transporting conveyer belt 65 by the screened-grain transporting conveyer belt 78 and thus returned to the granulating device 66, where they are granulated again.

The granulate grains covered with the first covering material in the first granulate covering device 81 are fed from the screen classifier 84 at the outlet of the first granulate covering device 81 to the second granulate covering device 83, where a diluted solution of a second covering material is sprayed onto such grains. The granulate grains having the covering diluted solution sprayed thereon are fed from the conveyer 89 at the outlet of the second granulate covering device 83 to the dryer 90, where they are dried. The temperature of the dryer 90 is maintained at a level of 85° C. or more. The dried grains are fed to the product tank 93 by the dried-granulate transporting conveyer belt 92 to provide a product which is to be shipped.

In this embodiment, the product is provided after drying of the grains, but a solution of volatile empenthrine in a non-alcoholic organic solvent and a diluted solution of polyvinyl alcohol may be sprayed after the drying of the grains. In this case, the diluted solution of polyvinyl alcohol and the solution of volatile empenthrine in the non-alcoholic organic solvent may be formed separately and sprayed.

In addition, in this embodiment, no insecticide is incorporated in the granular core section, but for example, the solution of empenthrine in the non-alcoholic organic solvent may be blended in the water-absorbable resin and fed through the water supplying pipe 68, whereby it may be incorporated in the granulate. When the empenthrine is blended in the highly water-absorbable resin, it is preferable that the blending is carried out with an increased amount of the highly water-absorbable resin, and the mixture is dried under a weaker drying condition.

Example 1

This example is a case where a kitty litter was produced using the apparatus shown in FIG. 1. 86 parts by weight of a pet bottle powder resulting from pulverization into a particle size of 1 mm or less and 4 parts by weight of a highly water-absorbable resin were placed into a ribbon mixer, and water was added to the mixture, where they were mixed together to provide a mixture having a water content of 40% by weight. The mixture was placed into an extruding zone in the extrusion-type granulating device, where the mixture was extruded through a die including an opening having a diameter of 5.5 mm and a plate thickness of 30 mm, and a resulting material was properly chipped and granulated in a chopper. The produced granulate was regulated in grain size in the grain size regulating device and placed into the vibration-type covering disc device, where a covering material comprised of a mixture of 65 parts by weight or a paper powder having a particle size of 0.4 mm or less and 35 parts by weight of a highly water-absorbable resin having a particle size of 150 µm or less was scattered onto a surface of the granulate at a proportion of 10% by weight based on the granulate to cover the granulate, while vibrating the dish-like disc. The covered granulate was loosened in the grain size regulating device and dried in the hot air drying machine, until the water content reached 13%.

A resulting kitty litter product was a granulate having a grain size of 10 to 5 mm. This granulate had a calorific value of 5,219 kcal/kg upon drying, and a calorific value of 4,457 kcal/kg when the water content was of 13%. The calorific value of 10 g of kitty litter having 21 g of water absorbed thereinto, i.e., in a so-called wetted state after being used was 1,004 kcal/kg, which showed that the product after being used can be incinerated or burnt up. These grains were collected to provide sands for a cat toilet.

In a room, 30 ml of a pseudo urine made dissolving 10 g of table salt and 10 ml of aqueous ammonia into 1,000 ml of tap water was added to 20 g of the sands for the cat toilet, and a sand portion coagulated by the pseudo urine was removed. In the toilet sands in this example, the amount of a toilet sand portion which was not coagulated by the pseudo urine was 4.5 g. Therefore, the amount of the cat sands required for forming a coagulated mass by the pseudo urine was 15.5 g.

Thus, the amount of water absorbed in the toilet sands in this example was 30 g/15.5 g, i.e., the water absorbing ability was 1.95 times.

The sands for the cat toilet were laid at a thickness of 3 cm in a toilet and used. The cat used the sands as a toilet as usual, and as a result, there was no hindrance for use.

After the cat used the sands for excretion, that portion of the sands for cat toilet in which the cat excreted could be easily removed. Moreover, the sands for the cat toilet in this example had water-absorbing and deodorizing properties and hence, the generation of an uncomfortable odor in the room could be avoided.

Example 2

This example is a case where the cat sands produced using the apparatus shown in FIG. 1. In this example, 55 parts by weight of a pet bottle powder resulting from pulverization into a particle size of 1 mm or less, 20 parts by weight of used tea leaves, 20 parts by weight of a computer paper and 5 parts by weight of a highly water-absorbable resin (Haimo Sub 500, from Haimo Co.) were placed in a ribbon mixer, and water was added to the mixture, where they were mixed together to provide a mixture having a water content of 40% by weight. The mixture was placed into an extruding zone in the extrusion-type granulating device, where the mixture was extruded through a die including an opening having a diameter of 5.5 mm and a plate thickness of 30 mm, and a resulting material was properly chipped and granulated in a chopper. A produced granulate was regulated in grain size in the grain size regulating device and placed into the vibration-type covering disc device, where a covering material comprised of a mixture of 65 parts by weight or a paper powder having a particle size of 0.4 mm or less and 35 parts by weight of a highly water-absorbable resin having a particle size of 150 µm or less was scattered onto a surface of the granulate at a proportion of 10% by weight based on the granulate to cover the granulate, while vibrating the dish-like disc. The covered granulate was loosened in the grain size regulating device and dried in the hot air drying machine, until the water content reached 13%.

A resulting kitty litter product was a granulate having a grain size of 10 to 5 mm. This granulate had a calorific value of 5,008 kcal/kg upon drying, and a calorific value of 4,274 kcal/kg when the water content was of 13%. The calorific value of 10 g of cat sands having 19.5 g of water absorbed thereinto, i.e., in a so-called wetted state after being used was 1,026 kcal/kg, which showed that the product after being used can be incinerated or burnt up. These grains were collected to provide sands for a cat toilet.

In a room, 30 ml of a pseudo urine made dissolving 10 g of table salt and 10 ml of aqueous ammonia into 1,000 ml of tap water was added to 20 g of the sands for the cat toilet, and a sand portion coagulated by the pseudo urine was removed. In the toilet sands in this example, the amount of a toilet sand portion which was not coagulated by the pseudo urine was 4.5 g. Therefore, the amount of the cat sands required for forming a coagulated mass by the pseudo urine was 15.5 g.

Thus, the amount of water absorbed in the toilet sands in this example was 30 g/15.5 g, i.e., the water absorbing ability was 1.95 times.

The sands for the cat toilet were laid at a thickness of 3 cm in a toilet and used. The cat used the sands as a toilet as usual, and as a result, there was no hindrance for use.

After the cat used the sands for excretion, that portion of the sands for cat toilet in which the cat excreted could be easily removed. Moreover, the sands for the cat toilet in this example had water-absorbing and deodorizing properties and hence, the generation of an uncomfortable odor in the room could be avoided.

Example 3

This example is a case where the cat sands produced using the apparatus shown in FIG. 1. In this example, 76.5 parts by weight of a pet bottle powder resulting from pulverization into a particle size of 1 mm or less, 9 parts by weight of an alpha starch and 4.5 parts by weight of a highly water-absorbable resin (Haimo Sub 500, from Haimo Co.) were placed in a mixer, and water was added to the mixture, where they were mixed together to provide a mixture having a water content of 40% by weight. The mixture was placed into an extruding zone in the extrusion-type granulating device, where the mixture was extruded through a die including an opening having a diameter of 5.5 mm and a plate thickness of 30 mm, and a resulting material was properly chipped and granulated in a chopper. The produced granulate was regulated in grain size in the grain size regulating device and placed into the vibration-type covering disc device, where a covering material comprised of the pulverized computer paper, a mixture of 30 parts by weight of a paper powder having a particle size of 0.4 mm or less and 70 parts by weight of a highly water-absorbable resin (Haimo Sub 500, from Haimo Co.) having a particle size of 150 μm or less was scattered onto a surface of the granulate at a proportion of 10% by weight based on the granulate to cover the granulate, while vibrating the dish-like disc. The covered granulate was loosened in the grain size regulating device and dried in the hot air drying machine, until the water content reached 13%.

A resulting cat sands product was a granulate having a grain size of 10 to 5 mm. This granulate had a calorific value of 5,170 kcal/kg upon drying, and a calorific value of 4,313 kcal/kg when the water content was of 13%. The calorific value of 10 g of kitty litter having 21 g of water absorbed thereinto, i.e., in a so-called wetted state after being used was 1,770 kcal/kg, which showed that the product after being used can be incinerated or burnt up. These grains were collected to provide sands for a cat toilet.

In a room, 30 ml of a pseudo urine made dissolving 10 g of table salt and 10 ml of aqueous ammonia into 1,000 ml of tap water was added to 20 g of the sands for the cat toilet, and a sand portion coagulated by the pseudo urine was removed. In the toilet sands in this example, the amount of a toilet sand portion which was not coagulated by the pseudo urine was 4.5 g. Therefore, the amount of the cat sands required for forming a coagulated mass by the pseudo urine was 15.5 g.

Thus, the amount of water absorbed in the toilet sands in this example was 30 g/15.5 g, i.e., the water absorbing ability was 1.95 times.

The sands for the cat toilet were laid at a thickness of 3 cm in a toilet and used. The cat used the sands as a toilet as usual, and as a result, there was no hindrance for use.

After the cat used the sands for excretion, that portion of the sands for cat toilet in which the cat excreted could be easily removed. Moreover, the sands for the cat toilet in this example had water-absorbing and deodorizing properties and hence, the generation of an uncomfortable odor in the room could be avoided.

Example 4

This example is a case where the cat sands produced using the apparatus shown in FIG. 2. In this example, 75 parts by weight of a pet bottle powder resulting from pulverization into a particle size of 1 mm or less, 5 parts by weight of a highly water-absorbable resin (Haimo Sub 500, from Haimo Co.) and 10 parts by weight of an alpha starch were placed in a ribbon mixer, and water was added to the mixture, where they were mixed together to provide a mixture having a water content of 40% by weight. The mixture was placed into an extruding zone in the extrusion-type granulating device, where the mixture was extruded through a die including an opening having a diameter of 5.5 mm and a plate thickness of 30 mm, and a resulting material was properly chipped and granulated in a chopper. The produced granulate was regulated in grain size in the grain size regulating device and placed into the vibration-type covering disc device, where a covering material comprised of a mixture of 6.5 parts by weight of a paper powder having a particle size of 0.4 mm or less pulverized from computer paper and 3.5 parts by weight of a highly water-absorbable resin (Haimo Sub 500, from Haimo Co.) having a particle size of 150 μm or less was scattered onto a surface of the granulate at a proportion of 15% by weight based on the granulate to cover the granulate, while vibrating the dish-like disc. The covered granulate was loosened in the grain size regulating device and dried in the hot air drying machine, until the water content reached 13%.

A resulting kitty litter product was a granulate having a grain size of 10 to 5 mm. This granulate had a calorific value of 4,644 kcal/kg upon drying, and a calorific value of 3,957 kcal/kg when the water content was of 13%. The calorific value of 10 g of cat sands having 15 g of water absorbed thereinto, i.e., in a so-called wetted state after being used was 1,770 kcal/kg, which showed that the product after being used can be incinerated or burnt up. These grains were collected to provide sands for a cat toilet.

In a room, 30 ml of a pseudo urine made dissolving 10 g of table salt and 10 ml of aqueous ammonia into 1,000 ml of tap water was added to 20 g of the sands for the cat toilet, and a sand portion coagulated by the pseudo urine was removed. In the toilet sands in this example, the amount of a toilet sand portion which was not coagulated by the pseudo urine was non-existent. Therefore, the amount of the cat sands required for forming a coagulated mass by the pseudo urine was 20 g.

Thus, the amount of water absorbed in the toilet sands in this example was 30 g/20 g, i.e., the water absorbing ability was 1.5 times.

The sands for the cat toilet were laid at a thickness of 3 cm in a toilet and used. The cat used the sands as a toilet as usual, and as a result, there was no hindrance for use.

After the cat used the sands for excretion, that portion of the sands for cat toilet in which the cat excreted could be easily removed. Moreover, the sands for the cat toilet in this example had water-absorbing and deodorizing properties and hence, the generation of an uncomfortable odor in the room could be avoided.

Example 5

This example is a case where the cat sands produced using the apparatus shown in FIG. 2. In this example, 30 parts by weight of a polypropylene woven fabric powder resulting from pulverization into a particle size of 1 mm or less, 30% by weight of a polyethylene film powder, 15 parts by weight of a paper powder having a particle size of 0.4 mm or less pulverized from a computer paper and 5 parts by weight of a highly water-absorbable resin (Haimo Sub 500, from Haimo Co.) were placed in a ribbon mixer, and water was added to the mixture, where they were mixed together to provide a mixture having a water content of 40% by weight. The mixture was placed into an extruding zone in the extrusion-type granulating device, where the mixture was extruded through a die including an opening having a diameter of 5.5 mm and a plate thickness of 30 mm, and a resulting material was properly chipped and granulated in a chopper. The produced granulate was regulated in grain size in the grain size regulating device and placed into the vibration-type covering disc device, where a covering material comprised of a mixture of 12 parts by weight of a paper powder having a particle size of 0.4 mm or less pulverized from computer paper, and 8 parts by weight of a highly water-absorbable resin (Haimo Sub 500, from Haimo Co.) having a particle size of 150 μm or less was scattered onto a surface of the granulate at a proportion of 20% by weight based on the granulate to cover the granulate, while vibrating the dish-like disc. The covered granulate was loosened in the grain size regulating device and dried in the hot air drying machine, until the water content reached 13%.

A resulting kitty litter product was a granulate having a grain size of 10 to 5 mm. This granulate had a calorific value of 7,945 kcal/kg upon drying, and a calorific value of 6,829 kcal/kg when the water content was of 13%. The calorific value of 10 g of kitty litter having 15 g of water absorbed thereinto, i.e., in a so-called wetted state after being used was 1,623 kcal/kg, which showed that the product after being used can be incinerated or burnt up. These grains were collected to provide sands for a cat toilet.

In a room, 30 ml of a pseudo urine made dissolving 10 g of table salt and 10 ml of aqueous ammonia into 1,000 ml of tap water was added to 20 g of the sands for the cat toilet, and a sand portion coagulated by the pseudo urine was removed. In the toilet sands in this example, the amount of a toilet sand portion which was not coagulated by the pseudo urine was non-existent. Therefore, the amount of the cat sands required for forming a coagulated mass by the pseudo urine was 20 g.

Thus, the amount of water absorbed in the toilet sands in this example was 30 g/20 g, i.e., the water absorbing ability was 1.5 times.

In a room, 30 ml of a pseudo urine made dissolving 10 g of table salt and 10 ml of aqueous ammonia into 1,000 ml of tap water was added to 20 g of the sands for the cat toilet, and a sand portion coagulated by the pseudo urine was removed. In the toilet sands in this example, the amount of a toilet sand portion which was not coagulated by the pseudo urine was 4 g. Therefore, the amount of the cat sands required for forming a coagulated mass by the pseudo urine was 16 g.

Thus, the amount of water absorbed in the toilet sands in this example was 30 g/16 g, i.e., the water absorbing ability was 1.9 times.

The sands for the cat toilet were laid at a thickness of 3 cm in a toilet and used. The cat used the sands as a toilet as usual, and as a result, there was no hindrance for use.

After the cat used the sands for excretion, that portion of the sands for cat toilet in which the cat excreted could be easily removed. Moreover, the sands for the cat toilet in this example had water-absorbing and deodorizing properties and hence, the generation of an uncomfortable odor in the room could be avoided.

Example 6

49 parts by weight upon drying of a polyethylene terephthalate, 2 parts by weight upon drying of a highly water-absorbable resin and 49 parts by weight upon drying of bentonite powder were placed in a ribbon mixer, and water was added to the mixture, where they were mixed together to provide a mixture having a water content of 40% by weight. The mixture was placed into an extruding zone in the extrusion-type granulating device, where the mixture was extruded through a die including an opening having a diameter of 5.5 mm and a plate thickness of 25 mm, and a resulting material was properly chipped and granulated. The produced bentonite powder of 17 parts be weight were sprinkled and covered in the same manner as on the surface of the granulate. The covered granulate was dried by the hot air drying machine, until the water content reached 13%, thereby providing a granulate having an average diameter of 6 mm and a length of 7 to 10 mm. The granulate had a calorific value of 2,287 kcal/kg upon drying, a calorific value of 1,907 kcal/kg when the water content was of 13%, and the grains of the granulate were collected to provide sands for a cat toilet.

In a room, a pseudo urine containing 1% of sodium nitrium having a temperature of 35° C. was added to the sands for the cat toilet. The sands could absorb an amount of water 1 to 1.5 times the entire amount of the sands.

After the cat used the sands for excretion, that portion of the sands for cat toilet in which the cat excreted could be easily removed. Moreover, the sands for the cat toilet in this example had water-absorbing and deodorizing properties and hence, the generation of an uncomfortable odor in the room could be avoided.

Example 7

49 parts by weight of a polyethylene terephthalate, 1 part by weight of Haimo Sub 500, from Haimo Company (brand name) and 49 parts by weight upon drying of bentonite powder were placed in a mixer, and mixed with water to provide a mixture having a water content of 40% by weight. The mixture was placed into an extruding zone in the extrusion-type granulating device, where the mixture was extruded through a die including an opening having a diameter of 5.5 mm and a plate thickness of 25 mm, and a resulting material was properly chipped and granulated. A covering material comprised of a mixture of 20 parts by weight of a paper powder having a particle size of 0.4 mm, 10 parts by weight of a highly water-absorbable resin and 70 parts by weight of bentonite powder was scattered onto a surface of the granulate at a proportion of 20% by weight in the same manner as the granulate. A diluted solution of polyethylene glycol diluted ten times is sprayed over the mixture covered by the bentonite powder. The covered granulate was dried by the hot air drying machine, until the water content reached 13%, thereby providing a granulate having an average diameter of 6 mm and a length of 6 to 15 mm. The granulate had a calorific value of 2,497 kcal/kg upon drying, a calorific value of 2,088 kcal/kg when the water content was of 13%, and the grains of the granulate were collected to provide sands for a cat toilet.

In a room, a pseudo urine containing 1% of sodium nitrium having a temperature of 35° C. was added to the sands for the cat toilet. The sands could absorb an amount of water 1 to 1.5 times the entire amount of the sands.

The sands for the cat toilet were laid at a thickness of 3 cm in a toilet and used. The cat used the sands as a toilet as usual, and as a result, there was no hindrance for use.

After the cat used the sands for excretion, that portion of the sands for cat toilet in which the cat excreted could be easily removed. Moreover, the sands for the cat toilet in this example had water-absorbing and deodorizing properties and hence, the generation of an uncomfortable odor in the room could be avoided.

Example 8

50 parts by weight upon drying of a plastic waste from a paper diaper including the pulverized inedible paper diaper classified by screening, polyethylene, polypropylene, separated paper and an elastic rubber, 47 parts by weight upon drying of a reburnt-pulp sludge ash product and 3% by weight of a highly water-absorbable resin are placed in a mixer, and mixed with water to provide a mixture having a water content of 40% by weight. A mixture having a water content of 35.5% by weight, was placed into an extruding zone in the extrusion-type granulating device, where the mixture was extruded through a die including an opening having a diameter of 5.5 mm and a plate thickness of 25 mm, and a resulting material was properly chipped and granulated. A covering material comprised of a mixture of 55 parts by weight of a paper powder and 45 parts by weight of a highly water-absorbable resin was scattered onto a surface of the granulate at a proportion of 13% by weight in the same manner as the granulate. The covered granulate was dried by the hot air drying machine, until the water content reached 13%, thereby providing a granulate having an average diameter of 6 mm and a length of 7 to 10 mm. The granulate had a calorific value of 4,944 kcal/kg upon drying, a calorific value of 4,218 kcal/kg when the water content was of 13%, and the grains of the granulate were collected to provide sands for a cat toilet.

In a room, a pseudo urine containing 1% of sodium nitrium having a temperature of 35° C. was added to the sands for the cat toilet. The sands could absorb an amount of water 1 to 3 times the entire amount of the sands.

The sands for the cat toilet were laid at a thickness of 3 cm in a toilet and used. The cat used the sands as a toilet as usual, and as a result, there was no hindrance for use.

After the cat used the sands for excretion, that portion of the sands for cat toilet in which the cat excreted could be easily removed. Moreover, the sands for the cat toilet in this example had water-absorbing and deodorizing properties and hence, the generation of an uncomfortable odor in the room could be avoided.

Example 9

20 parts by weight upon drying of the plastic waste from a paper diaper in example 3, 60 parts by weight of used tea leaves with a water content of 65% by weight, 17 parts by weight upon drying of a reburnt-pulp sludge ash product and 3% by weight of a highly water-absorbable resin are placed in a mixer, and mixed with water to provide a mixture having a water content of 39% by weight. A mixture was placed into an extruding zone in the extrusion-type granulating device, where the mixture was extruded through a die including an opening having a diameter of 5.5 mm and a plate thickness of 25 mm, and a resulting material was properly chipped and granulated. A covering material comprised of a mixture of 50 parts by weight of a paper powder, 10 parts by weight of a reburnt-pulp sludge ash product and 40 parts by weight of a highly water-absorbable resin was scattered onto a surface of the granulate at a proportion of 13% by weight in the same manner as the granulate. The covered granulate was dried by the hot air drying machine, until the water content reached 13%, thereby providing a granulate having an average diameter of 6 mm and a length of 7 to 10 mm. The granulate had a calorific value of 5,064 kcal/kg upon drying, a calorific value of 4,323 kcal/kg when the water content was of 13%, and the grains of the granulate were collected to provide sands for a cat toilet.

In a room, a pseudo urine containing 1% of sodium nitrium having a temperature of 35° C. was added to the sands for the cat toilet. The sands could absorb an amount of water 1 to 3 times the entire amount of the sands.

The sands for the cat toilet were laid at a thickness of 3 cm in a toilet and used. The cat used the sands as a toilet as usual, and as a result, there was no hindrance for use.

After the cat used the sands for excretion, that portion of the sands for cat toilet in which the cat excreted could be easily removed. Moreover, the sands for the cat toilet in this example had water-absorbing and deodorizing properties and hence, the generation of an uncomfortable odor in the room could be avoided.

Example 10

37 parts by weight upon drying of the plastic waste from a paper diaper in example 3, 37 parts by weight of used tea leaves with a water content of 65% by weight, 23 parts by weight upon drying of bentonite and 3% by weight of a highly water-absorbable resin are placed in a mixer, and mixed with 36 kg of water to provide a mixture having a water content of 44% by weight. A mixture was placed into an extruding zone in the extrusion-type granulating device, where the mixture was extruded through a die including an opening having a diameter of 5.5 mm and a plate thickness of 25 mm, and a resulting material was properly chipped and granulated. A covering material comprised of a mixture of 20 parts by weight of bentonite powder, 50 parts by weight of a paper powder that have passed through a screen with an opening of 0.4 mm, and 30 parts by weight of a highly water-absorbable resin was scattered onto a surface of the granulate at a proportion of 13% by weight in the same manner as the granulate. The covered granulate was dried by the hot air drying machine, until the water content reached 12%, thereby providing a granulate having an average diameter of 6 mm and a length of 7 to 10 mm. The granulate had a calorific value of 5,667 kcal/kg upon drying, a calorific value of 4,847 kcal/kg when the water content was of 12%, and the grains of the granulate were collected to provide sands for a cat toilet.

In a room, a pseudo urine containing 1% of sodium nitrium having a temperature of 35° C. was added to the sands for the cat toilet. The sands could absorb an amount of water 1 to 3 times the entire amount of the sands.

The sands for the cat toilet were laid at a thickness of 3 cm in a toilet and used. The cat used the sands as a toilet as usual, and as a result, there was no hindrance for use.

After the cat used the sands for excretion, that portion of the sands for cat toilet in which the cat excreted could be easily removed. Moreover, the sands for the cat toilet in this example had water-absorbing and deodorizing properties and hence, the generation of an uncomfortable odor in the room could be avoided.

Example 11

37 parts by weight upon drying of a pet bottle powder, 20 parts by weight upon drying of a reburnt-pulp sludge ash product, 40 parts by weight of used tea leaves with a water content of 65% by weight, 23 parts by weight upon drying of bentonite and 3% by weight of a highly water-absorbable resin are placed in a mixer, and mixed with water to provide a mixture having a water content of 32% by weight. A mixture was placed into an extruding zone in the extrusion-type granulating device, where the mixture was extruded through a die including an opening having a diameter of 5.5 mm and a plate thickness of 25 mm, and a resulting material was properly chipped and granulated. A covering material comprised of a mixture of 25 parts by weight of bentonite powder, 25 parts by weight of a reburnt-pulp sludge ash product and 50 parts by weight of a highly water-absorbable resin was scattered onto a surface of the granulate at a proportion of 15% by weight in the same manner as the granulate. The covered granulate was dried by the hot air drying machine, until the water content reached 12%, thereby providing a granulate having an average diameter of 6 mm and a length of 7 to 10 mm. The granulate had a calorific value of 3,595 kcal/kg upon drying, a calorific value of 3,045 kcal/kg when the water content was of 12%, and the grains of the granulate were collected to provide sands for a cat toilet.

In a room, a pseudo urine containing 1% of sodium nitrium having a temperature of 35° C. was added to the sands for the cat toilet. The sands could absorb an amount of water 1 to 3 times the entire amount of the sands.

The sands for the cat toilet were laid at a thickness of 3 cm in a toilet and used. The cat used the sands as a toilet as usual, and as a result, there was no hindrance for use.

After the cat used the sands for excretion, that portion of the sands for cat toilet in which the cat excreted could be easily removed. Moreover, the sands for the cat toilet in this example had water-absorbing and deodorizing properties and hence, the generation of an uncomfortable odor in the room could be avoided.

These embodiments use a plastic waste powder such as a polyethylene terephthalate and a paper diaper plastic waste as a starting material, but it is possible to substitute one part of the polyethylene terephthalate with another plastic waste. When a wetted plastic waste is used as a starting material, water need not be supplied from the outside, if the contained water enables granulation. However, if the amount of the contained water is larger than required, then it is preferable that the same type of plastic waste or another type of paper diaper waste is added in the dehydrated or dried form to adjust the water content.

INDUSTRIAL APPLICABILITY

The mammalian excrement treating article, according to the present invention, is a mammalian excrement treating article with an inorganic compounding material added to the plastic waste powder, which in comparison to the conventional mammalian excrement treating article, is suitable for treatment of incineration, making it possible to produce an inexpensive mammalian excrement treating article.

Also, according to the present invention, the mammalian excrement treating article can effectively utilize said plastic waste for treatment of waste as it is, and, furthermore, can decrease the calorific value of the high calorific value plastic waste and consequently the high calorific value waste as it is in the mammalian excrement treating article, thus it has the function for treating incineration with a less amount of heat. As compared with the conventional mammalian excrement treating article, it is easier to treat the waste.

As described above, with the present invention, as compared with the conventional mammalian excrement treating article, it is possible to solve a problem concerning the discarding of the plastic waste and a problem concerning the non-burnability of the conventionally used mammalian excrement treating article at one time, and to expel the insects living in the skin of a mammal or animal. The mammalian excrement treating article according to the present invention is significantly useful in respect of an effective utilization of resources, a reduction in cost for disposal of the plastic waste powder, an alleviation in dealing with environmental wastes and the like.

What is claimed is:

1. A mammalian excrement treating article comprising a plastic waste powder having a particle size of 3 mm or less, a smaller weight amount of a water-absorbable resin and an organic compounding material.

2. A mammalian excrement treating article according to claim 1, wherein said organic compounding material is selected from the croup consisting of a paper sludge of used tea leaves, a coffee extraction residue, a paper powder, a wood flour and a mixture of two or more thereof.

3. A mammalian excrement treating article comprising a plastic waste powder having a particle size of 3 mm or less, a smaller weight amount of a water-absorbable resin, an inorganic compounding material and an organic compounding material.

4. A mammalian excrement treating article according to claim 3, wherein said organic compounding material is selected from the group consisting of a paper sludge of used tea leaves, a coffee extraction residue, a paper powder, a wood flour and a mixture of two or more thereof.

5. A mammalian excrement treating article according to claim 3, wherein said inorganic compounding material is selected from the group consisting of a powder of bentonite, zeolite, reburnt-pulp sludge ash, vermiculite and perlite.

6. A mammalian excrement treating article comprising a plastic waste powder having a particle size of 3 mm or less, a smaller weight amount of water-absorbable resin, an amount of pyrethloid-based insecticide larger than the amount of water-absorbable resin, and an organic compounding material.

7. A mammalian excrement treating article according to claim 6, wherein said organic compounding material is selected from the group consisting of a paper sludge of used tea leaves, a coffee extraction residue, a paper powder, a wood flour and a mixture of two or more thereof.

8. A mammalian excrement treating article comprising a plastic waste powder having a particle size of 3 mm or less, a smaller weight amount of a water-absorbable resin, an amount of pyrethloid-based insecticide larger than the amount of water-absorbable resin, an organic compounding material and an inorganic compounding material.

9. A mammalian excrement treating article according to claim 8, wherein said organic compounding material is selected from the group consisting of a paper sludge of used tea leaves, a coffee extraction residue, a paper powder, a wood flour and a mixture of two or more thereof.

10. A mammalian excrement treating article according to claim 8, wherein said inorganic compounding material is selected from the group consisting of a powder of bentonite, zeolite, reburnt-pulp sludge ash, vermiculite and perlite.

11. A mammalian excrement treating article comprising a granular core section containing a powder of pulverized paper waste powder having a particle size of 3 mm or less, an organic compounding material, and a weight amount of water-absorbable resin powder smaller than the weight amount of said paper waste; and a covering layer section covering a surface of said granular core section and containing a paper powder and a water-absorbable resin powder.

12. A mammalian excrement treating article according to claim 11, wherein said organic compounding material is selected from the group consisting of a paper sludge of used tea leaves, a coffee extraction residue, a paper powder, a wood flour and a mixture of two or more thereof.

13. A mammalian excrement treating article according to claim 12, wherein a fungicide is contained in said granular core section or said covering layer section, or in both of said granular core section and said covering layer section.

14. A mammalian excrement treating article comprising a granular core section containing a powder of pulverized paper waste powder having a particle size of 3 mm or less, an organic compounding materials an inorganic compounding material, and a weight amount of a water-absorbable resin powder smaller than the weight amount of said paper waste; and a covering layer section covering a surface of said granular core section and containing a paper powder and a water-absorbable resin powder.

15. A mammalian excrement treating article according to claim 14, wherein said organic compounding material is selected from the group consisting of a paper sludge of used tea leaves, a coffee extraction residue, a paper powder, a wood flour and a mixture of two or more thereof.

16. A mammalian excrement treating article according to claim 14, wherein said inorganic compounding material is selected from the Group consisting of a powder of bentonite, zeolite, reburnt-pulp sludge ash, vermiculite and perlite.

17. A mammalian excrement treating article according to claim 14, wherein a fungicide is contained in said granular core section or said covering layer section, or in both of said granular core section and said covering layer section.

18. A mammalian excrement treating article comprising a granular core section containing an organic compounding material, a powder of pulverised paper waste having a particle size of 3 mm or less and a smaller weight amount of water-absorbable resin powder, pulverized paper, a weight amount of pyrethroid-based insecticide larger than the weight amount of a water-absorbable resin; and a covering layer section covering a surface of said granular core section and containing a paper powder and a water-absorbable resin powder.

19. A mammalian excrement treating article according to claim 18, wherein said organic compounding material is selected from the group consisting of a paper sludge of used tea leaves, a coffee extraction residue, a paper powder, a wood flour and a mixture of two or more thereof.

20. A mammalian excrement treating article according to claim 18, wherein a fungicide is contained in said granular core section or said covering layer section, or in both of said granular core section and said covering layer section.

21. A mammalian excrement treating article comprising a granular core section comprising plastic waste and an organic compounding material and an inorganic compounding material and at least one covering layer section thereon.

22. A mammalian excrement treating article according to claim 21, wherein said organic compounding material is selected from the group consisting of a paper sludge of used tea leaves, a coffee extraction residue, a paper powder, a wood flour and a mixture of two or more thereof.

23. A mammalian excrement treating article according to claim 21, wherein said inorganic compounding material is selected from the group consisting of a powder of bentonite, zeolite, reburnt-pulp sludge ash, vermiculite and perlite.

24. A mammalian excrement treating article according to claim 21, wherein a fungicide is contained in said granular core section or said covering layer section, or in both of said granular core section and said covering layer section.

25. A process for producing a lower calorific value mammalian excrement treating article, comprising the steps of pulverizing a plastic waste into a powder having a particle size of 3 mm or less; mixing said powder of the pulverized plastic waste with a smaller weight amount of a water-absorbable resin and an organic compounding material; and granulating the mixture.

26. A process according to claim 25, wherein said organic compounding material is selected from the group consisting of a paper sludge of used tea leaves, a coffee extraction residue, a paper powder, a wood flour and a mixture of two or more thereof.

27. A process for producing a mammalian excrement treating article, comprising the steps of pulverizing a paper waste into a powder having a particle size of 3 mm or less; mixing said powder of the pulverized plastic waste with a smaller weight amount of water-absorbable resin and an inorganic compounding material and an organic compounding material; and granulating the mixture.

28. A process according to claim 27, wherein said organic compounding material is selected from the group consisting of a paper sludge of used tea leaves, a coffee extraction residue, a paper powder, a wood flour and a mixture of two or more thereof.

29. A process according to claim 27, wherein said inorganic compounding material is selected from the group consisting of a powder of bentonite, zeolite, reburnt-pulp sludge ash, vermiculite and perlite.

30. A process for producing a low calorific value mammalian excrement treating article, comprising the steps of pulverizing a plastic waste into a powder having a particle size of 3 mm or less; mixing said powder of the pulverized plastic waste with a smaller weight amount a water-absorbable resin and an organic compounding material, and granulating the mixture with a paper pulp, a water-absorbable resin and a volume of volatile pryethloid-based insecticide larger than the water-absorbable resin.

31. A process according to claim 30, wherein said organic compounding material is selected from the group consisting of a paper sludge of used tea leaves, a coffee extraction residue, a paper powder, a wood flour and a mixture of two or more thereof.

32. A process according to claim 30, wherein said inorganic compounding material is selected from the group consisting of a powder of bentonite, zeolite, reburnt-pulp sludge ash, vermiculite and perlite.

* * * * *